United States Patent [19]
Merlat

[11] 3,763,569
[45] Oct. 9, 1973

[54] TAPE MEASURE
[76] Inventor: Joanny Merlat, Besancon, France
[22] Filed: Mar. 22, 1972
[21] Appl. No.: 237,182

[30] Foreign Application Priority Data
Apr. 1, 1971  France .............................. 7112399

[52] U.S. Cl. ............................................... 33/138
[51] Int. Cl. ........................................... G01b 3/10
[58] Field of Search ................ 33/137 R, 138, 139, 33/140

[56]  References Cited
UNITED STATES PATENTS
3,004,346  10/1961  Quenot ................................ 33/138

FOREIGN PATENTS OR APPLICATIONS
1,564,056  11/1968  France ................................ 33/138
1,507,297  11/1967  France ................................ 33/138
1,550,437  12/1968  France ................................ 33/138
854,198    11/1960  Great Britain ..................... 33/138

Primary Examiner—Louis R. Prince
Assistant Examiner—Charles E. Phillips
Attorney—Thomas B. Van Poole et al.

[57]  ABSTRACT

A tape measure comprises a tape wound between a pair of side plates forming an open frame having a first arm with a haft and a second arm, disposed at about 120° to the first, with means for guiding unwound tape along a given direction. A rear plane face of the haft, substantially perpendicular to said given direction, and extensions to the haft and to the second arm which lie in a plane perpendicular to the plane face of the haft, form means for resting the tape measure against perpendicular plane surfaces to facilitate the taking of inner measurements.

2 Claims, 2 Drawing Figures

PATENTED OCT 9 1973　　　　　　　　　　　　3,763,569

TAPE MEASURE

The invention relates to tape measures.

In order to take relatively large "inner" measurements, i.e., to measure the distance between two facing substantially planar surfaces, for example facing walls of a room, to date use has generally been made of folding rules or extensible tape measures. Folding rules have the disadvantage that they must be placed at successively made marks and the overall distance is arrived at by an addition which, although fairly simple, is a source of error and adds to the tediousness of the operation. The same drawback applies when relatively short (for example 1 metre or 1 yard) tape measures are used. When a tape of sufficient dimensions to span the room is employed, one of the ends of the tape generally has to be folded up against a wall, which hinders reading.

It is therefore an object of the invention to provide a tape measure which is particularly suitable for taking relatively large inner measurements.

A tape measure according to the invention comprises a pair of spaced-apart parallel plates forming an open frame, a graduated tape wound on a drum between said plates, said frame comprising first and second arms extending from the axis of the drum along substantially different directions, a haft on the first arm, and means on the second arm for at least approximately guiding unwound tape along a given direction, in which the haft comprises means defining a first abutment plane substantially perpendicular to said given direction, and the haft and the second arm comprise means defining a second abutment plane perpendicular to the first abutment plane.

The term abutment plane is herein used to mean a plane along which an outermost part or parts of the tape measure lie(s), which outermost part of parts can be applied against a plane surface to hold the tape measure in a given orientation relative to the plane surface.

An embodiment of a tape measure according to the invention will now be particularly described, by way of example, with reference to the accompanying drawings, in which.

Figure 1:
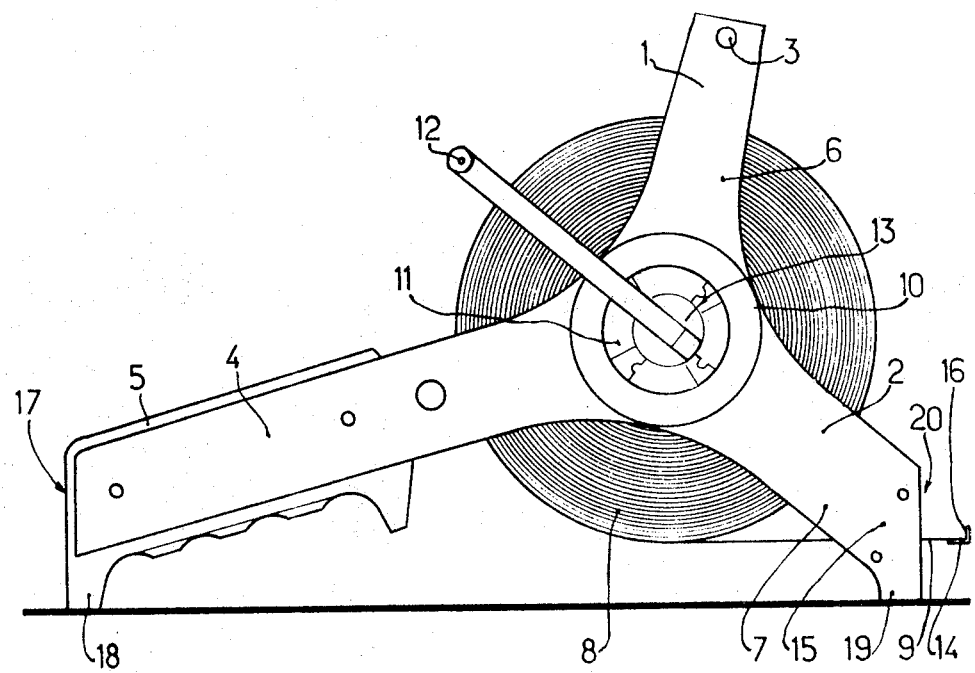
FIG. 1 is a side elevational view of the tape measure.

The tape measure comprises an open frame 1 comprising a pair of spaced-apart parallel side-plates 2 connected to each other, inter alia , by means of screws and cross-pieces 3.

The side-plates 2 each have three arms extending at approximately 120° to one another, namely an arm 4 to which a haft 5 is fixed, and arms 6 and 7, between which a reel 8 of tape 9 is wound on a rotatably mounted drum 10. A known type of drive mechanism 11 for the drum 10 comprises a foldable crank 12 pivotally mounted in a clevis 13 so that, depending on the position of the crank 12, the drum 10 may be driven or disengaged. Irrespective of the operation effected (winding or unwinding), the tape passes between two guide pieces 15 (for example rollers) at the end of the arms 7. The tape 9 has, at its free end 14, a stop 16 which comes to rest against an end face 20 of the arm 7 when the tape 9 is fully wound up. In addition, the haft 5 has a plane rear face 17, and a downwardly protruding extension 18.

The arms 7 terminate with an extension 19, the lower face of which is exactly in line with the lower face of the extension 18 of the haft and is perpendicular to the plane of face 17. The distance between the stop-forming face 17 and the end face 20 of the arm 7 is fixed, and preferably has a convenient value, for example 20 cm.

Figure 2:
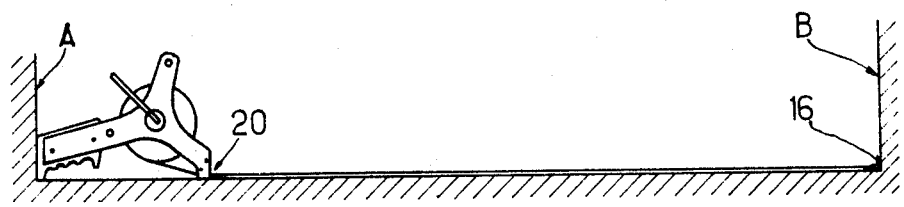
FIG. 2 is a schematic view showing the tape measure in position for taking an inner measurement.

With reference to FIG. 2, when it is desired to carry out an inner measurement between walls A and B, the face 17 of the haft 5 is placed flat against one of the walls, for example A, with the two extensions 18 and 19 resting, for example, on the ground. The tape is unwound towards the wall B, against which the end 16 is applied. The distance between A and B is equal to the distance between B and the face 20 plus the distance between the faces 17 and 20. The origin of graduations on the tape is displaced beyond the free end 16 of the tap by an amount corresponding to the distance separating the faces 17 and 20, which permits the distance between A and B to be directly read on the graduations by means of a reference mark on the face 20. Obviously, the tape may also be graduated normally, i.e., with the origin of the graduations at the free end of the tape, in which case the afore-mentioned length, for example 20 cm, must be added to the figure read for such.

To provide an instrument for the direct reading of both inner and outer dimensions, the tape may be printed on one face (preferably the upper face, looking at the figures) with graduations having a displaced origin, and with "normal" graduations on the other face. Alternatively, the two scales could be provided on opposite edges of the same face of the tape.

The described instrument, without being more costly than a conventional open-framed tape measure, can therefore be used to directly take inner and outer measurements, and the user is able to operate quickly with a minimum risk of error.

What is claimed is:

1. A tape measure comprising a pair of spaced apart parallel plates forming an open frame, a graduated tape wound on a drum rotatably mounted about its axis between said plates and having a free end, said frame comprising first and second arms extending from the axis of said drum at an obtuse angle to one another, a haft on said first arm, means on said second arm for guiding unwound tape to enable withdrawal of unwound tape along a given direction, said haft including means defining a first abutment plane perpendicular to said given direction and a supporting surface in a second abutment plane which is perpendicular to said first abutment plane, said second arm including a support surface in said second abutment plane, and reference means on said second arm for reading graduations on the tape, said tape carrying a graduated scale the origin of which is displaced beyond the free end of the tape by an amount corresponding to the distance separating said reference means on the second arm from said first abutment plane.

2. A tape measure according to claim 1, in which said obtuse angle between said first and second arms is about 120°.

* * * * *

UNITED STATES PATENT OFFICE
CERTIFICATE OF CORRECTION

Patent No. 3,763,569          Dated   October 9, 1973

Inventor(s)   Joanny Merlat

It is certified that error appears in the above-identified patent and that said Letters Patent are hereby corrected as shown below:

The frontal page is amended after the inventor's name and address by the insertion of:

-- Assignee:  Stanley Mabo
                       Besacon, France.--

Signed and sealed this 5th day of March 1974.

(SEAL)
Attest:

EDWARD M. FLETCHER, JR.          C. MARSHALL DANN
Attesting Officer                Commissioner of Patents